US009644547B2

(12) United States Patent
Hyodo et al.

(10) Patent No.: US 9,644,547 B2
(45) Date of Patent: May 9, 2017

(54) ENGINE CONTROL DEVICE FOR WORK VEHICLE

(71) Applicant: KCM Corporation, Hyogo (JP)

(72) Inventors: Koji Hyodo, Kasumigaura (JP); Masaki Yoshikawa, Kasama (JP); Isamu Aoki, Tsukuba (JP); Tetsuji Tanaka, Abiko (JP)

(73) Assignee: KCM Corporation, Hyogo (JP)

( * ) Notice: Subject to any disclaimer, the term of this patent is extended or adjusted under 35 U.S.C. 154(b) by 333 days.

(21) Appl. No.: 14/356,784

(22) PCT Filed: Nov. 15, 2012

(86) PCT No.: PCT/JP2012/079689
§ 371 (c)(1),
(2) Date: May 7, 2014

(87) PCT Pub. No.: WO2013/073632
PCT Pub. Date: May 23, 2013

(65) Prior Publication Data
US 2014/0303879 A1   Oct. 9, 2014

(30) Foreign Application Priority Data
Nov. 15, 2011 (JP) ................. 2011-250020

(51) Int. Cl.
| F02D 29/02 | (2006.01) |
| F02D 17/04 | (2006.01) |
| F02D 29/04 | (2006.01) |
| E02F 3/34 | (2006.01) |
| E02F 9/20 | (2006.01) |
| E02F 9/22 | (2006.01) |
| F02N 11/08 | (2006.01) |

(52) U.S. Cl.
CPC ............ *F02D 29/02* (2013.01); *E02F 3/3411* (2013.01); *E02F 9/202* (2013.01); *E02F 9/2066* (2013.01);
(Continued)

(58) Field of Classification Search
CPC ........ F02D 29/02; F02D 17/04; E02F 9/2083; E02F 9/2296; E02F 9/2066; E02F 3/3411;
(Continued)

(56) References Cited

U.S. PATENT DOCUMENTS 5,277,269 A * 1/1994 Ichimura ............... B60W 10/06
180/306
6,334,834 B1 * 1/2002 Mizutani ............... B60T 13/585
477/203
(Continued)

FOREIGN PATENT DOCUMENTS

| GB | 2 424 964 A | 10/2006 |
| JP | 58-38346 A | 3/1983 |

(Continued)

OTHER PUBLICATIONS

International Search Report dated Dec. 11, 2012 with English translation (five (5) pages).
(Continued)

*Primary Examiner* — Thomas Moulis
*Assistant Examiner* — Susan Scharpf
(74) *Attorney, Agent, or Firm* — Crowell & Moring LLP

(57) ABSTRACT

An engine control device for a work vehicle decides that an idling stop condition is established when the front device is in the unengaged state, the steering device is in the unengaged state, the accelerator pedal is in the non-operation state, either the transmission is in the neutral state or the parking brake device is in the engaged state or the transmission is in the neutral state and also the parking brake device is in the engaged state, and the service brake device is in the unengaged state, and stops an engine when it is decided that it passes the predetermined length of time since it was decided that the idling stop condition was established.

5 Claims, 8 Drawing Sheets

(52) U.S. Cl.
CPC .......... *E02F 9/2083* (2013.01); *E02F 9/2246* (2013.01); *E02F 9/2296* (2013.01); *F02D 17/04* (2013.01); *F02D 29/04* (2013.01); *F02N 11/084* (2013.01); *F02N 11/0822* (2013.01); *F02N 2200/0802* (2013.01); *F02N 2200/0803* (2013.01); *F02N 2200/0808* (2013.01); *F02N 2200/101* (2013.01); *Y02T 10/48* (2013.01)

(58) Field of Classification Search
CPC ....... E02F 9/2246; E02F 9/202; F02N 11/084; F02N 11/0822; F02N 2200/0802; F02N 2200/0803; F02N 2200/101; F02N 2200/0808; Y02T 10/48
USPC .......................................................... 701/112
See application file for complete search history.

(56) References Cited

U.S. PATENT DOCUMENTS

| | | | | |
|---|---|---|---|---|
| 7,098,549 | B2* | 8/2006 | Asakage | B60H 1/00378 290/40 R |
| 2004/0149245 | A1* | 8/2004 | Moriya | B60K 6/48 123/179.4 |
| 2006/0236970 | A1* | 10/2006 | Inada | B60R 25/042 123/179.4 |
| 2007/0256657 | A1* | 11/2007 | Celisse | F02N 11/006 123/179.3 |
| 2007/0267238 | A1* | 11/2007 | Guy | B60K 28/04 180/272 |
| 2013/0268166 | A1* | 10/2013 | Kim | F02D 17/04 701/50 |
| 2015/0147147 | A1* | 5/2015 | Uchiyama | E02F 3/32 414/687 |

FOREIGN PATENT DOCUMENTS

| | | |
|---|---|---|
| JP | 11-336586 A | 12/1999 |
| JP | 2001-336434 A | 12/2001 |
| JP | 2003-65097 A | 3/2003 |
| JP | 2004-108226 A | 4/2004 |
| JP | 2005-171905 A | 6/2005 |
| JP | 2007-83784 A | 4/2007 |
| JP | 2010-25057 A | 2/2010 |

OTHER PUBLICATIONS

Extended European Search Report issued in counterpart European Application No. 12850064.2 dated Oct. 19, 2015 (seven (7) pages).

* cited by examiner

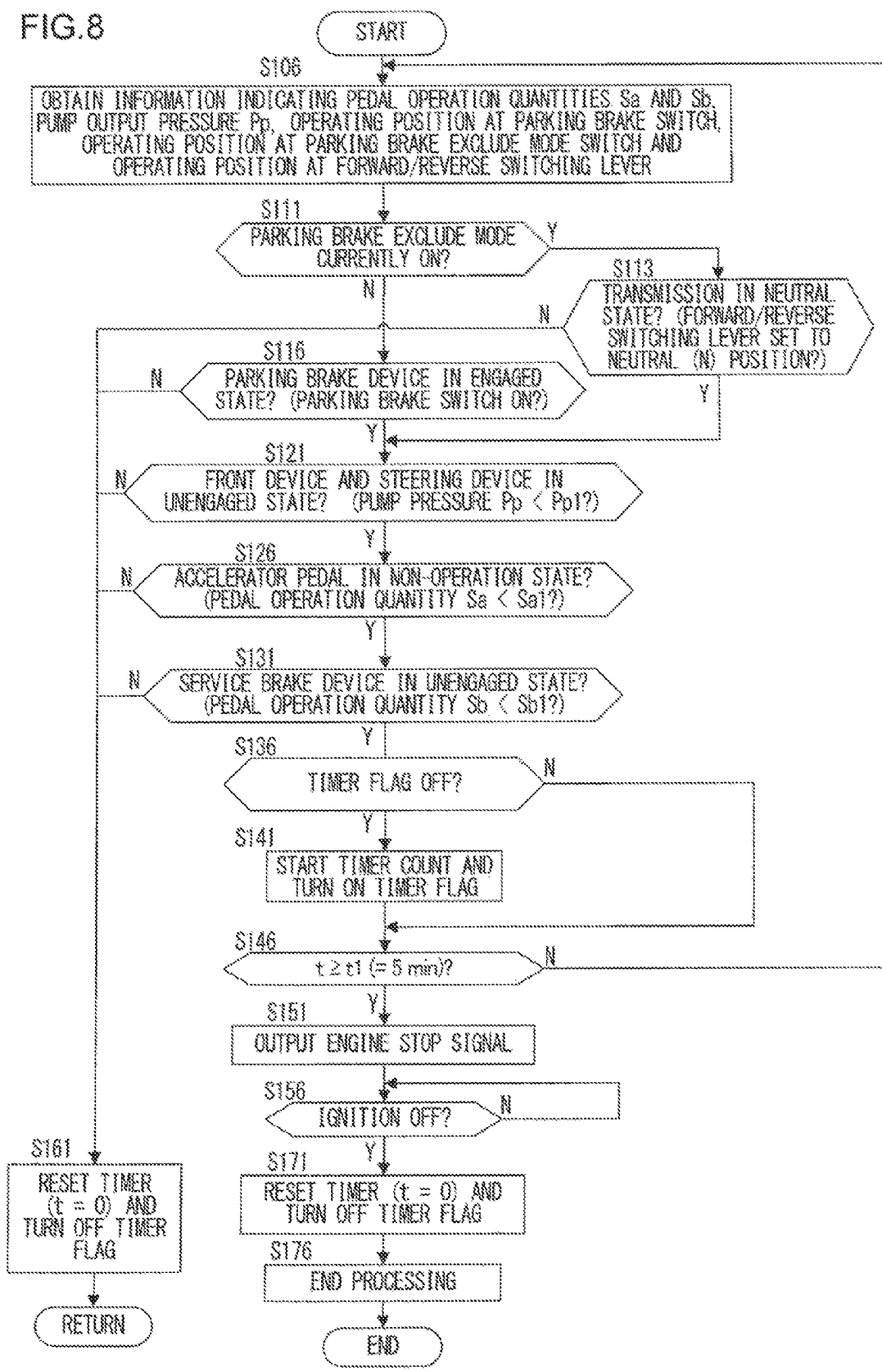

ENGINE CONTROL DEVICE FOR WORK VEHICLE

TECHNICAL FIELD

The present invention relates to an engine control device for work vehicle.

BACKGROUND ART

There is an engine control device for a work vehicle known in the related art that automatically stops an idling engine when a state, in which a control lever operated to engage a front device in operation remains unoperated, is sustained over a preselected length of time (see patent literature 1).

CITATION LIST

Patent Literature

Patent literature 1: Japanese Laid Open Patent Publication No. 2003-65097

SUMMARY OF THE INVENTION

Technical Problem

The engine control device disclosed in patent literature 1 automatically stops the idling engine once the state in which the control lever remains unoperated is sustained over the preselected length of time. This means that under control executed by the engine control device in patent literature 1, the engine automatically stops if the control lever remains unoperated over a length of time exceeding the preselected time length while the work vehicle is traveling under inertial force (e.g., while the work vehicle is coasting on flat ground at minimum idling engine speed or while the work vehicle is traveling downhill at minimum idling engine speed). Thus, the operator of the work vehicle equipped with the engine control device disclosed in patent literature 1 needs to pay close attention at all times in order to prevent the engine from stopping while the work vehicle is coasting.

Solution to Problem

According to the 1st aspect of the present invention, an engine control device for a work vehicle, comprises: a front device non-engagement decision-making unit that makes a decision as to whether or not a front device is in an unengaged state; a steering device non-engagement decision-making unit that makes a decision as to whether or not a steering device is in an unengaged state; a pedal non-operation state decision-making unit that makes a decision as to whether or not an accelerator pedal is in a non-operation state; a neutral state decision-making unit that makes a decision as to whether or not a transmission is in a neutral state; a parking brake engagement decision-making unit that makes a decision as to whether or not a parking brake device is in an engaged state; a service brake non-engagement decision-making unit that makes a decision as to whether or not a service brake device is in an unengaged state; a condition decision-making unit that decides that an idling stop condition has been established when the front device is in the unengaged state, the steering device is in the unengaged state, the accelerator pedal is in the non-operation state, either the transmission is in the neutral state or the parking brake device is in the engaged state or the transmission is in the neutral state and also the parking brake device is in the engaged state, and the service brake device is in the unengaged state; a time count unit that starts a time count when the condition decision-making unit has decided that the idling stop condition is established and continues the time count while the idling stop condition is in effect; a time passage decision-making unit that makes a decision as to whether or not the time count at the time count unit exceeds a predetermined length of time; and an engine automatic stop control unit that stops an engine when the time passage decision-making unit decides that the time count at the time count unit exceeds the predetermined length of time.

According to the 2nd aspect of the present invention, in the engine control device for a work vehicle according to the 1st aspect, it is preferred that the engine control device for a work vehicle further comprises an ignition switch that assumes at least three operating positions that are an engine start position, an engine on position and an engine stop position, and the time count at the time count unit is reset if the ignition switch is operated to the stop position after the engine is stopped via the engine automatic stop control unit.

According to the 3rd aspect of the present invention, in the engine control device for a work vehicle according to the 1st or the 2nd aspect, it is preferred that the engine control device for a work vehicle further comprises a selector member that excludes a state of engagement of the parking brake device from criteria for the idling stop condition.

According to the 4th aspect of the present invention, in the engine control device for a work vehicle according to the 3rd aspect, it is preferred that while the state of engagement of the parking brake device is excluded from the criteria for the idling stop condition via the selector member, the condition decision-making unit decides that the idling stop condition is established when the front device is in the unengaged state, the steering device is in the unengaged state, the accelerator pedal is in the non-operation state, the transmission is in the neutral state and the service brake device is in the unengaged state.

Advantageous Effect of the Invention

According to the present invention, which does not require the operator to pay close attention in order to ensure that an unintentional engine stop does not occur during operation, the onus placed on the operator can be lessened.

DESCRIPTION OF EMBODIMENT

Figure 1:
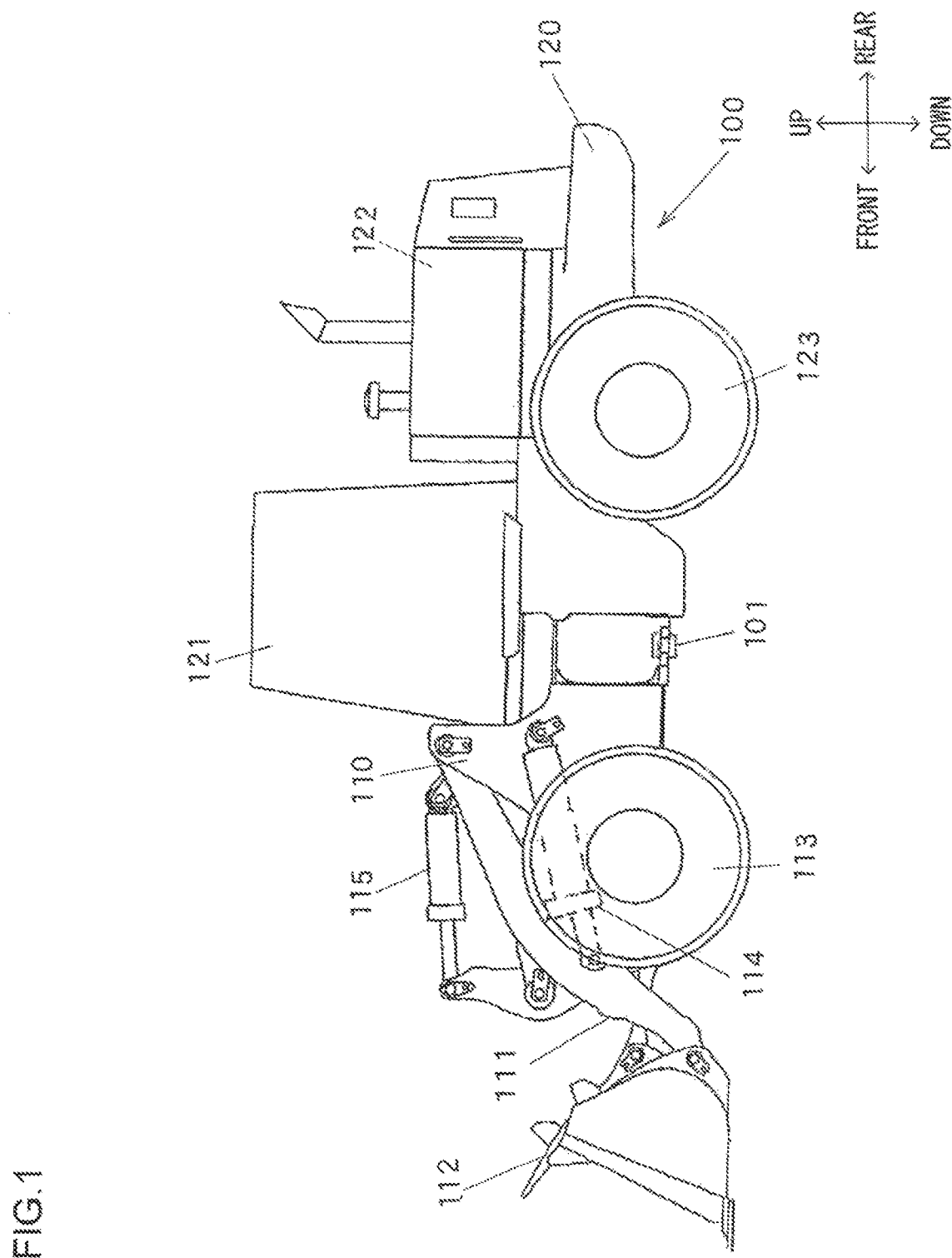
FIG. 1 A side elevation of a wheel loader representing an example of a work vehicle FIG. 2 An illustration of the operation members disposed in the operator's cab of the wheel loader FIG. 3 A diagram schematically illustrating the structure of the control system in the wheel loader FIG. 4 A diagram schematically illustrating the structure of the transmission FIG. 5 A diagram indicating the relationship between a lever operation quantity, representing the extent to which a control lever is operated, and the pilot pressure FIG. 6 A diagram indicating the relationship between the operation quantity at the accelerator pedal and the target engine rotation speed FIG. 7 A diagram indicating the relationship between the operation quantity at a brake pedal and the braking pressure FIG. 8 A flowchart of the engine auto-stop control processing operation executed in the wheel loader in an embodiment of the present invention

In reference to drawings, an embodiment of the engine control device for a work vehicle according to the present invention is described. FIG. 1 is a side elevation of a wheel loader 100 in the embodiment. The wheel loader 100 comprises a front body 110 that includes an arm 111, a bucket 112, tires 113 and the like and a rear body 120 that includes an operator's cab 121, an engine compartment 122, tires 123 and the like.

The lift arm (hereafter simply referred to as the arm) 111, which is mounted so as to be allowed to swing along the up/down direction relative to the front body 110, is rotationally driven by an arm cylinder 114. The bucket 112, which is mounted at the front end of the arm 111, is rotationally driven by a bucket cylinder 115 so as to tilt frontward/rearward (swing in the up/down direction relative to the arm 111). The front body 110 and the rear body 120 are connected with each other via a center pin 101 so as to articulate freely relative to each other. As steering cylinders (not shown) extend/contract, the front body 110 pivots to the left or to the right relative to the rear body 120.

Figure 2:
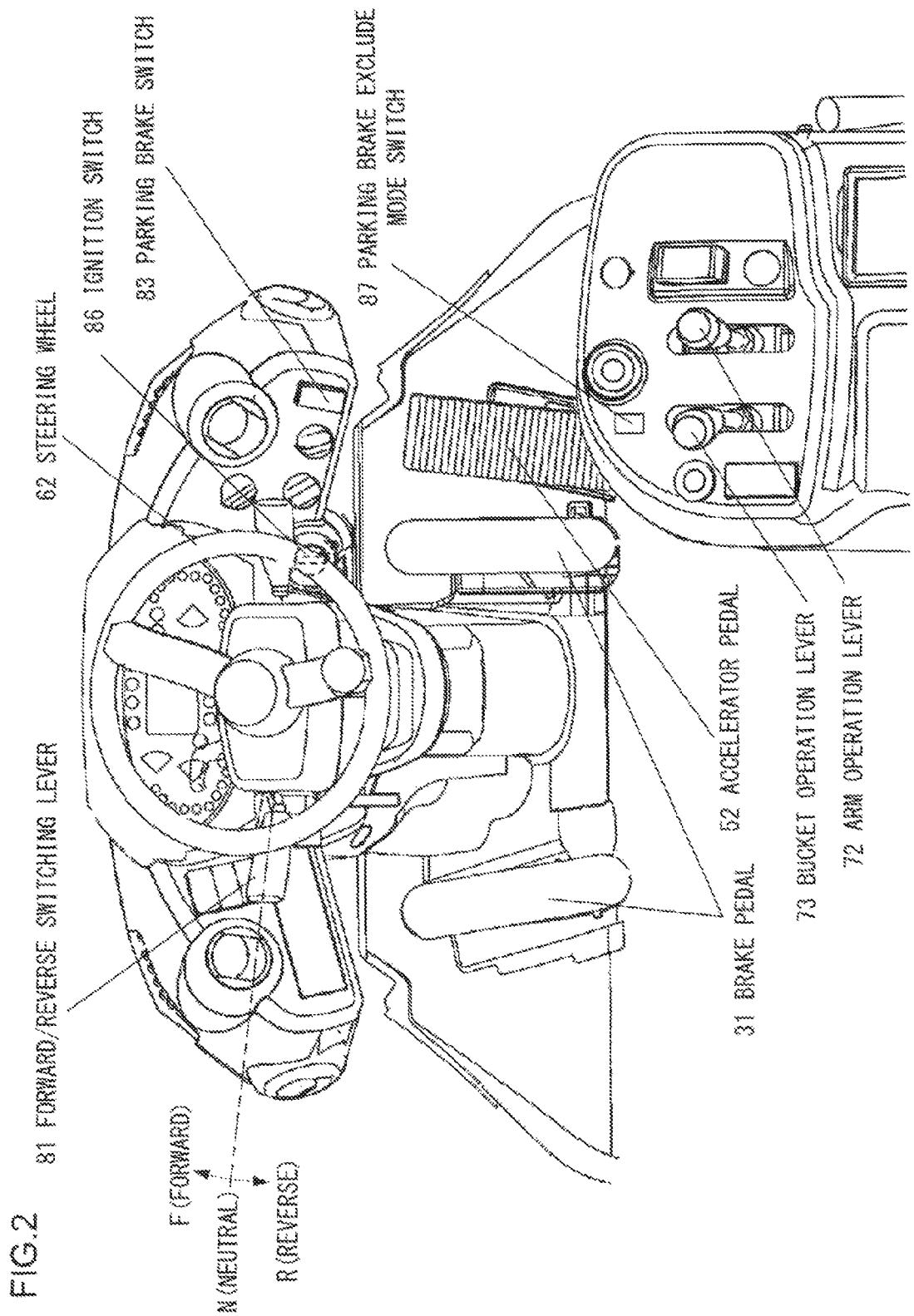

FIG. 2 is a schematic diagram illustrating the operation members disposed inside the operator's cab of the wheel loader 100. A steering wheel 62 operated by the operator to steer the wheel loader 100, an ignition switch 86 operated by the operator to start or stop the engine 1, an accelerator pedal 52, a pair of interlocked brake pedals 31, one disposed on the left side and the other on the right side, a parking brake switch 83 and a parking brake exclude mode switch 87 are disposed in the operator's cab. In addition, an arm operation lever 72, operated to swing the arm 111 upward or downward and a bucket operation lever 73 operated to rotate the bucket 112 rearward (swing up) or forward (swing down) are disposed in the operator's cab. The action of the bucket 112 rotating rearward may be otherwise described as the bucket 112 tilting. The action of the bucket 112 rotating forward may be otherwise described as the bucket 112 dumping.

A forward/reverse switching lever 81 is disposed under the steering wheel 62 so as to project out from a side of the steering column. In response to an operation of the forward/reverse switching lever 81, a forward signal carrying a forward instruction, a reverse signal carrying a reverse instruction or a neutral signal carrying a neutral instruction is output from the forward/reverse switching lever 81.

Figure 3:
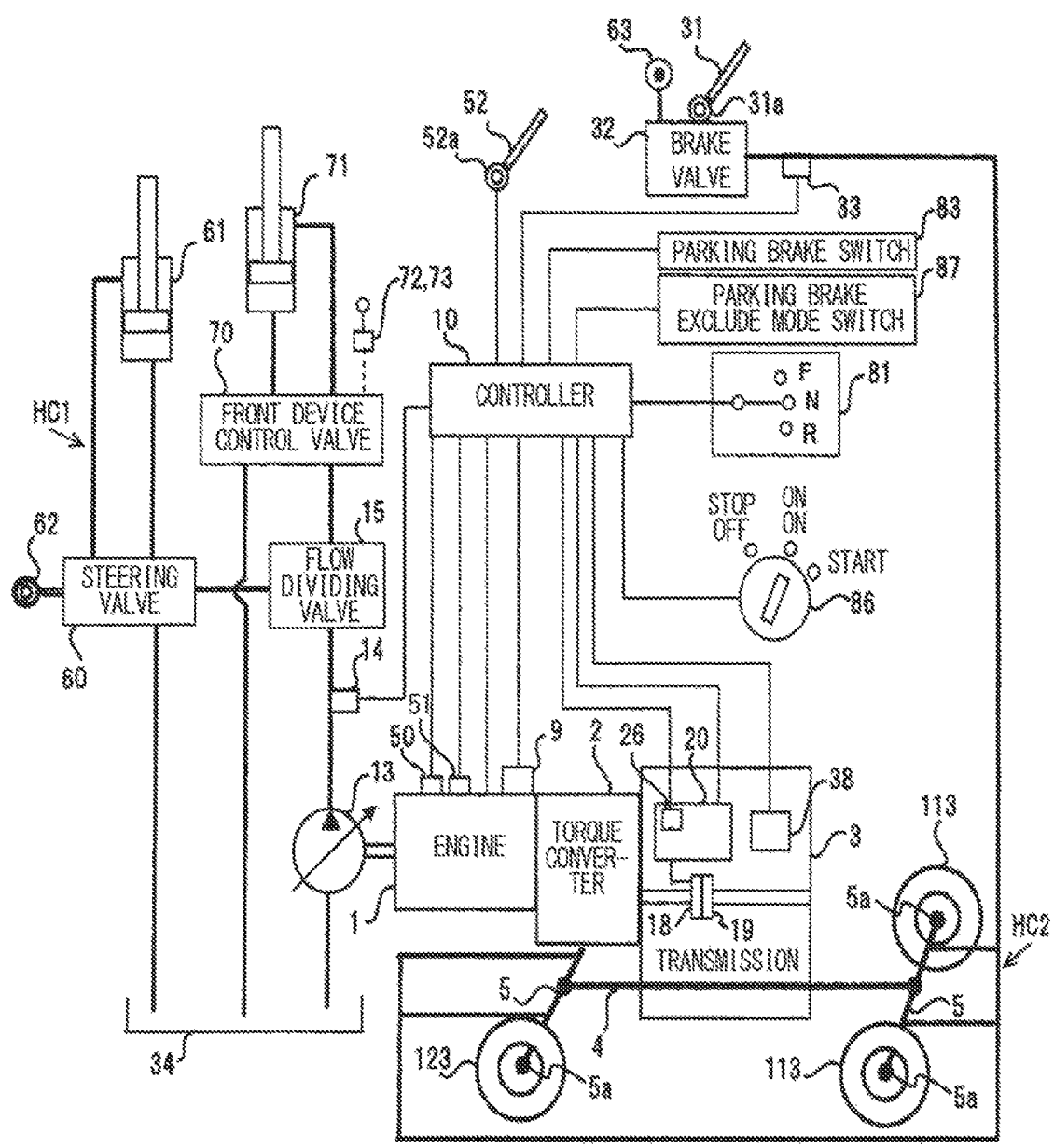

FIG. 3 presents a diagram schematically illustrating the structure of the control system in the wheel loader 100. An input shaft 21 (see FIG. 4) of a torque convener 2 is linked to an output shaft of an engine 1, whereas an output shaft 22 (see FIG. 4) of the torque converter 2 is linked to a transmission 3. The rotation of the engine 1 is transmitted to the transmission 3 via the torque converter 2, which is a fluid clutch configured with an impeller, a turbine and a stator of the known art. The transmission 3 includes hydraulic pressure clutches that switch the speed stage to a setting among first through fourth speeds, as will be explained later, and the speed of rotation of the output shaft 22 at the torque converter 2 is altered via the transmission 3. The rotation, having undergone the speed change is transmitted to the tires 113 and 123 via a drive shaft (propeller shaft) 4 and axles 5, thereby enabling the wheel loader 100 to travel.

The torque converter 2 has a function of increasing the output torque relative to the input torque, i.e., a function of achieving a torque ratio equal to or greater than 1. The torque ratio decreases as a torque convener speed ratio e (=Nt/N1), which is the ratio of the rotation speed Nt at the output shaft 22 to the rotation speed Ni at the input shaft 21 of the torque converter 2, increases. For instance, as the traveling load increases while the work vehicle is traveling at a constant engine rotation speed, the rotation speed Nt at the output shaft 22 of the torque converter 2 decreases, i.e., the vehicle speed decreases, to result in a decrease in the torque converter speed ratio e. In this situation, the torque ratio increases and thus, the vehicle is able to travel with a greater traveling drive force (with a greater tractive force).

Figure 4:
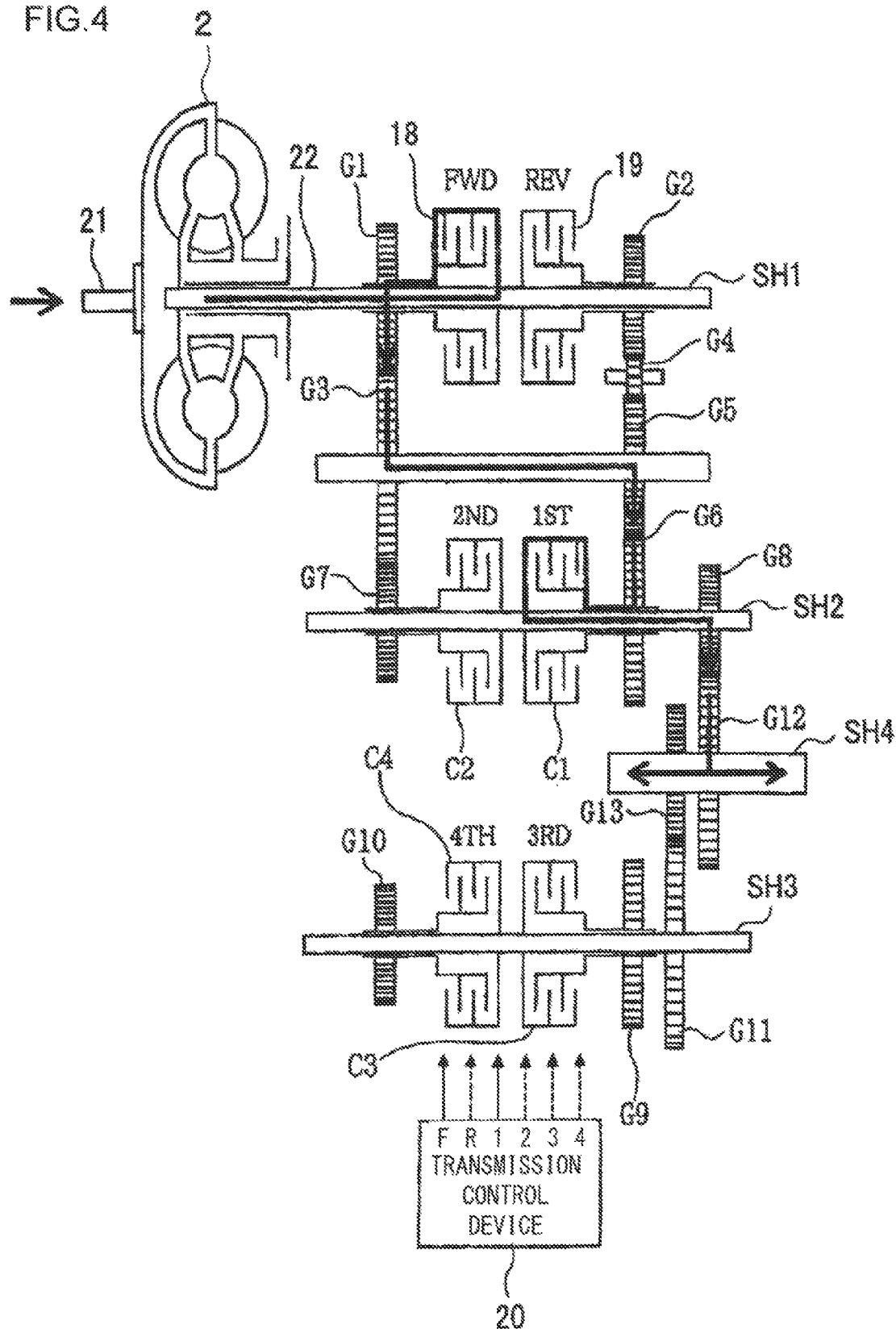

The structure of the transmission 3 will be described next. FIG. 4 schematically illustrates the structure of the transmission 3. The torque converter output is adjusted via the transmission 3 so as to achieve speed shifts through the first, second, third and fourth speeds. The transmission 3 includes a plurality of clutch shafts SH1 through SH3, an output shaft SH4, a plurality of gears G1 through G13, a forward hydraulic clutch (forward clutch) 18, a reverse hydraulic clutch (reverse clutch) 19 and hydraulic clutches C1 through C4 respectively corresponding to first through fourth speeds. The hydraulic clutches 18, 19 and C1 through C4 are each engaged or released with pressure oil (a clutch pressure) supplied via a transmission control device 20. In other words, as the clutch pressure supplied to a given hydraulic clutch among the hydraulic clutches 18, 19 and C1 through C4 increases, the particular clutch among the clutches 18, 19 and C1 through C4 is engaged whereas as the clutch pressure decreases, the clutch is released.

The output shaft 22 of the torque converter 2 is linked to the clutch shaft SH1, and the two ends of the output shaft SH4 are linked to the axles 5, located at the front and at the rear of the vehicle, via the drive shaft 4 shown in FIG. 3. FIG. 4 shows the forward clutch 18 and the first speed clutch C1 in the engaged state and the other clutches 19 and C2 through C4 in the released state. Under these circumstances, the gear G1 and the clutch shaft SH1 rotate as one and the gear G6 and the clutch shaft SH2 also rotate as one, In this situation, the output torque generated at the engine 1 is transmitted to the output shaft SH4 via the input shaft 21 and the output shaft 22 of the torque converter 2, the clutch shaft SH1, the forward clutch 18, the gears G1, G3, G5 and G6, the first speed clutch C1, the clutch shaft SH2 and the gears G8 and G12 as indicated by the bold line in FIG. 4. The work vehicle is thus able to travel at first speed.

When shifting from first speed to second speed, the first speed clutch C1 is set in the released state and the second speed clutch C2 is set in the engaged state with the clutch pressure provided via transmission control device 20. As a result, the output torque at the engine 1 is transmitted to the output shaft SH4 via the input shaft 21 and the output shaft 22 of the torque converter 2, the clutch shaft SH1, the forward clutch 18, the gears G1, G3 and G7, the second speed clutch C2, the clutch shaft SH2 and the gears G8 and G12, thereby enabling the work vehicle to travel in second gear. Likewise, a shift other than from first gear to second gear, i.e., a shift from second gear to third gear, from third gear to fourth gear, from fourth gear to third gear, from third gear to second gear or from second gear to first gear, is achieved by controlling the clutches C1 through C4.

Automatic speed shift control may be executed by adopting either of the following two methods; torque converter speed ratio reference control under which a speed shift occurs as the torque converter speed ratio e reaches a predetermined value and vehicle speed reference control under which a speed shift occurs as the vehicle speed reaches a predetermined value. In this embodiment, the speed stage at the transmission 3 is regulated under the torque converter speed ratio reference control.

As shown in FIG. 3, a hydraulic circuit HC 1 includes a hydraulic pump 13 driven by the engine 1, a front device actuator 71, a front device control valve 70, a steering actuator 61, a steering valve 60, a flow dividing valve 15, an oil tank 34 and a pump pressure sensor 14.

The flow dividing valve 15 divides the pressure oil output from the hydraulic pump 13 into a flow traveling toward the front device actuator 71 and a flow traveling toward the steering actuator 61 with a predetermined flow dividing ratio.

The front device at the wheel loader 100 achieved in this embodiment is configured so as to include the arm 111, the bucket 112, the front device actuator 71 and the front device control valve 70. While the arm cylinder 114, which rotationally drives the arm 111, and the bucket cylinder 115, which rotationally drives the bucket 112 are both front device actuators 71, the following description will be given by assuming that the arm cylinder 114 constitutes the front device actuator 71, for purposes of simplification. When the front device control valve 70 is engaged in operation in conjunction with the front device actuator 71 constituted with the arm cylinder 114, the front device control valve 70 functions as an arm control valve, via which the flow of pressure oil from the hydraulic pump 13 to the front device actuator 71 (arm cylinder 114) is controlled.

The steering device in the wheel loader 100 achieved in the embodiment is configured so as to include the steering actuator 61 and the steering valve 60. While the steering actuator 61 is constituted with a pair of steering cylinders, the figure shows a single representative steering cylinder. The two of steering cylinders are disposed between the front body 110 and the rear body 120. The steering cylinders are linked to the front body 110 at their base ends and are linked to the rear body 120 at their piston rods.

The pressure oil output from the hydraulic pump 13, which is driven by the engine 1, is supplied to the steering actuator 61 via the flow dividing valve 15 and the steering valve 60 and is also supplied to the front device actuator 71 via the flow dividing valve 15 and the front device control valve 70. The front device control valve 70 (arm control valve) is driven in response to an operation at the arm operation lever 72 and the front device actuator 71 (arm cylinder 114) is driven in correspondence to the operation quantity representing the extent to which the arm operation lever 72 is operated.

Figure 5:
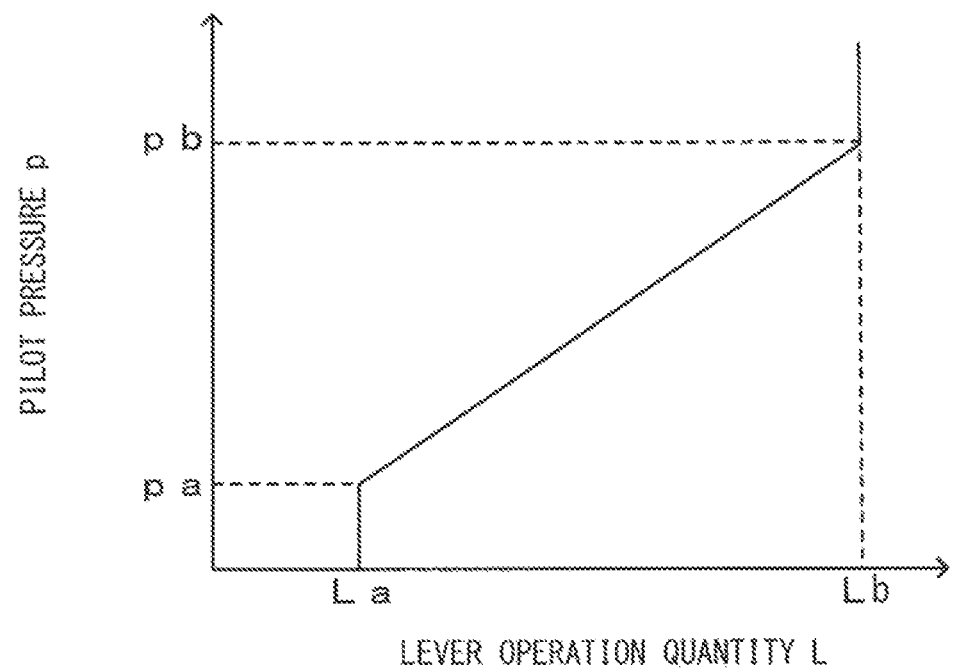

The arm operation lever 72, which is a control lever operated to engage the arm 111 in operation, outputs and arm raise/lower command. The arm operation lever 72 is a hydraulic pilot operation lever, and outputs a pilot pressure p in correspondence to the lever operation quantity L, as indicated in FIG. 5. When the lever operation quantity L is less than a minimum lever operation quantity La, the pilot pressure p does not rise, but once the lever operation quantity L becomes equal to the minimum lever operation quantity La, the pilot pressure p rises to pa.

The front device control valve 70 (arm control valve) is switched when the pilot pressure is equal to or greater than pa by factoring in the dead zone of the arm operation lever 72. A pilot pressure pb corresponds to a maximum lever operation quantity Lb for the arm operation lever 72. As long as the lever operation quantity L remains within the range between the minimum lever operation quantity La and the maximum lever operation quantity Lb, the pilot pressure p increases in proportion to the lever operation quantity L. It is to be noted that the bucket operation lever 73, which is also a hydraulic pilot operation lever similar to the arm operation lever 72, outputs a tilt/dump command for the bucket 112.

The steering wheel 62 is an operation member via which the vehicle advancing direction is set and the steering valve 60 is engaged in operation in correspondence to the rotational angle at the steering wheel 62. In correspondence to the rotational angle of the steering wheel 62, the flow of pressure oil from the hydraulic pump 13 to the steering actuator 61, i.e., the direction and the flow rate of pressure oil flow to each of the pair of steering cylinders, is controlled via the steering valve 60. As the steering wheel 62 is operated, the steering cylinders are made to extend/contract, thereby causing the front body 110 to pivot relative to the rear body 120, thereby steering the work vehicle.

The pump pressure sensor 14 detects an output pressure Pp at the hydraulic pump 13 and outputs a pump pressure signal to a controller 10. As will be explained later, the controller 10 makes a decision based upon the output pressure Pp at the hydraulic pump 13 having been detected, as to whether or not both the front device and the steering device are in an operating state.

As FIG. 3 shows, hydraulic service brake devices of the known art, which are engaged in operation to decelerate or stop the wheel loader 100 disposed at the wheel loader 100. The service brake devices 5a, each disposed at one of the axles 5, generate a braking force corresponding to the pressure of hydraulic oil supplied as braking oil via a brake valve 32. A foot brake pilot circuit HC 2 includes a pilot hydraulic source 63 that generates pressure oil as it is driven by the engine 1 and the brake valve 32, which generates a secondary pilot pressure (braking pressure) in correspondence to the extent to which a brake pedal 31 is operated. As the brake pedal 31 is operated, the braking pressure provided from the brake valve 32 is applied to the service brake devices 5a. As a result, the service brake devices 5a are engaged in operation in response to an operation at the brake pedal 31 and a braking force is thus generated.

The wheel loader 100 is equipped with an electric switch-type parking brake device of the known art. A parking brake device 38, disposed at the transmission 3, is engaged in operation so as to stop rotation of the output shaft at the transmission 3 in response to a control signal provided by the controller 10.

The controller 10 and an engine controller 9 shown in FIG. 3 are each configured with an arithmetic processing device that includes a CPU, a ROM, a RAM and other peripheral circuits. The ignition switch 86 is connected to the controller 10 which detects the operating position of the ignition switch 86. The ignition switch 86 assumes one of the following three operating positions, i.e., an engine start position, an engine on position and an engine stop position. As the ignition switch 86 is operated to the engine start position, the controller 10 outputs a start control signal to a starter motor 51 and the engine controller 9 so as to start the engine 1. Once the operation at the ignition switch 86 is completed, the ignition switch 86 is held at the on position. As the ignition switch 86 is operated to the stop position, the controller 10 executes end processing so as to turn off the engine 1 and cut the power.

A pedal operation quantity detector 52a that detects a pedal operation quantity Sa (the pedal stroke or the pedal angle) at the accelerator pedal 52 and an engine rotation rate sensor 50 that detects an actual rotation speed Na at the engine 1 and outputs an actual rotation speed signal to the controller 10 are connected to the controller 10.

Figure 6:
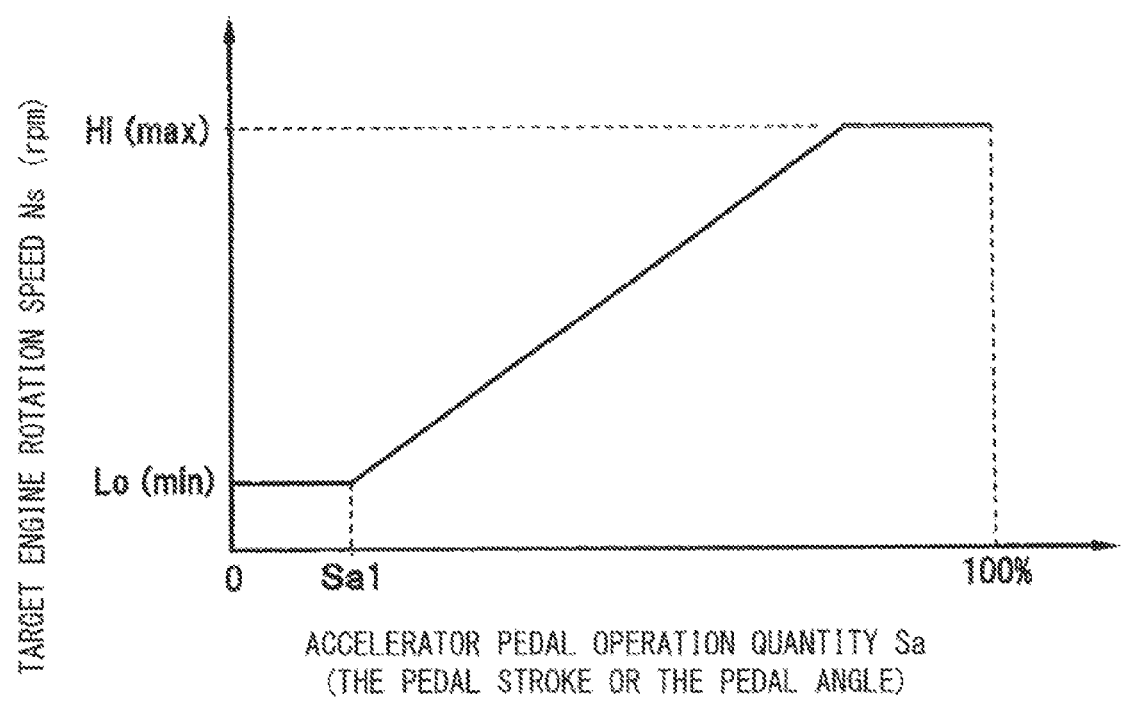

The controller 10 sets a target rotation speed Ns for the engine in correspondence to the operation quantity at the accelerator pedal 52 detected via the pedal operation quantity detector 52a and outputs a target rotation speed command to the engine controller 9 so as to control the actual rotation speed (rotation rate) of the engine 1. FIG. 6 indicates the relationship between the operation quantity Sa at the accelerator pedal 52 and the target engine rotation speed Ns. As the operation quantity Sa at the accelerator pedal 52 increases, a higher target engine rotation speed Ns is set, and the target engine rotation speed Ns corresponding to the maximum pedal operation quantity matches the rated rotation speed. The controller 10 executes control so that the actual rotation speeds Na at the engine 1 becomes equal to the target engine rotation speed Ns by outputting a control signal that corresponds to the target engine rotation speed Ns to the engine controller 9. When the operator wishes to increase the vehicle speed or increase the traveling drive force, he increases the operation quantity Sa at the accelerator pedal 52 and thus raises the engine rotation speed.

The engine controller 9 compares the actual rotation speed Na of the engine 1, detected via the engine rotation rate sensor 50, with the target engine rotation speed Ns provided by the controller 10 and controls a fuel injection system (not shown) so as to adjust the actual rotation speed Na at the engine 1 toward the target engine rotation speed Ns.

If the pedal operation quantity Sa detected by the pedal operation quantity detector 52a is equal to or greater than a predetermined value Sa1, the controller 10 decides that the accelerator pedal 52 is being operated, whereas if the pedal operation quantity Sa detected by the pedal operation quantity detector 52a is less than the predetermined value Sa1, it decides that the accelerator pedal 52 is currently not being operated (hereafter referred to as an accelerator pedal non-operation state). The predetermined value Sa, which is set to be also used as a threshold value for raising the target engine rotation speed Ns from a minimum idling rotation speed (e.g., 800 rpm), is stored in advance in the ROM or the RAM at the controller 10.

Figure 7:
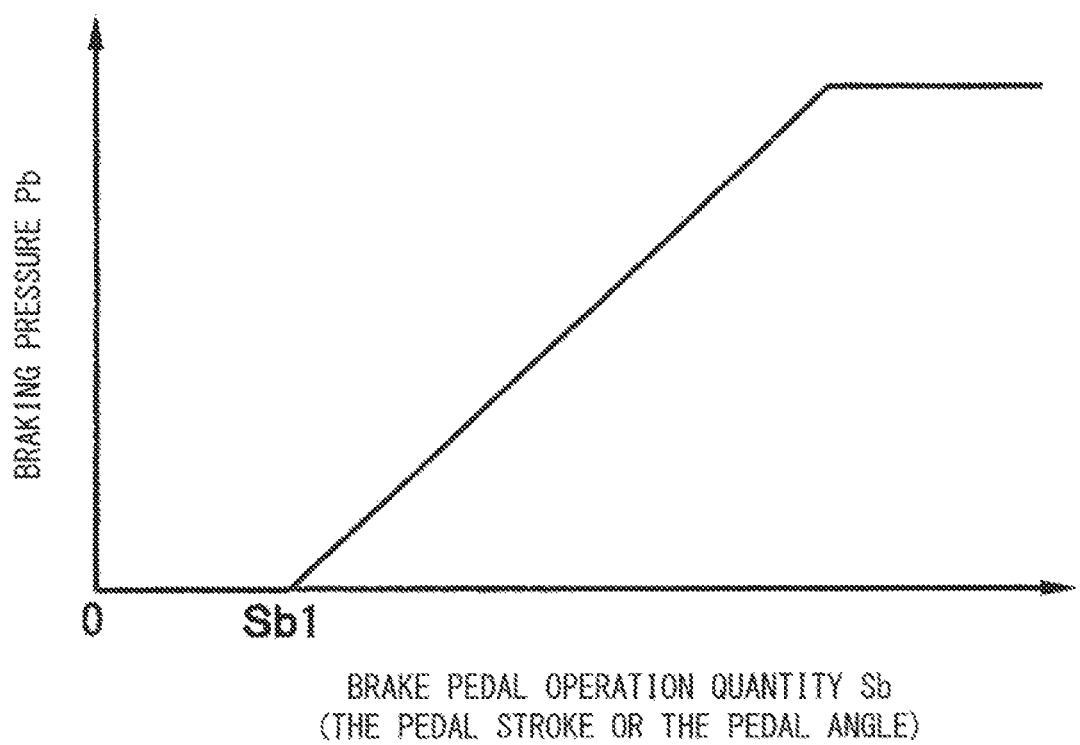

As shown in FIG. 3, an operation quantity (the pedal stroke or the pedal angle) at the brake pedal 31 is detected by a pedal operation quantity detector 31a connected to the controller 10. In addition, a pressure sensor 33 that detects the pressure (braking pressure) of the hydraulic oil supplied to the service brake devices 5a is also connected to the controller 10. FIG. 7 provides a diagram indicating the relationship between the operation quantity Sb at the brake pedal 31 and the braking pressure Pb. When the brake pedal 31 is operated to the extent represented by an operation quantity Sb equal to or greater than Sb1, the braking pressure Pb starts to rise. As the operation quantity Sb at the brake pedal 31 increases, the braking pressure Pb also rises and a braking force is applied to the wheel loader 100 in correspondence to the pedal operation quantity Sb.

When the pedal operation quantity Sb provided by the pedal operation quantity detector 31a is equal to or greater than the predetermined value Sb1, the controller 10 decides that the brake pedal 31 is being operated and thus the service brake devices 5a are engaged in operation, whereas when the pedal operation quantity Sb provided by the pedal operation quantity detector 31a is less than the predetermined value Sb1, the controller 10 decides that the brake pedal 31 is not being operated and thus the service brake devices 5a are not engaged in operation (hereafter referred to as the service brake devices 5a in an unengaged state). The predetermined value Sb1 is set as an operation quantity at which the braking pressure Pb will start to increase.

As FIG. 3 shows, the parking brake switch 83 is connected to the controller 10, which detects the operating position (on/off) of the parking brake switch 83. As the parking brake switch 83 is turned on, the controller 10 outputs an operation command to the parking brake device 38 built into the transmission 3. In response, the parking brake device 38 is engaged in operation and a braking force is thus applied to the vehicle for purposes of parking. The controller 10 decides that the parking brake device 38 is in the engaged state as long as the parking brake switch 83 is at the ON position.

The forward/reverse switching lever 81, via which a vehicle forward/reverse command is issued, is connected to the controller 10, which detects the operating position (forward (F)/neutral (N)/reverse (R)) of the forward/reverse switching lever 81. As the forward/reverse switching lever 81 is switched to the forward (F) position, the controller 10 outputs a control signal in response to which the forward clutch 18 is set in the engaged state, to the transmission control device 20. As the forward/reverse switching lever 81 is switched to the reverse (R) position, the controller 10 outputs a control signal, in response to which the reverse clutch 19 is set in the engaged state, to the transmission control device 20. Upon receiving a control signal for setting either the forward clutch 18 or the reverse clutch 19 in the engaged state, the transmission control device 20 increases the clutch pressure for engaging the forward clutch 18 or the reverse clutch 19 via a clutch control valve 26 (see FIG. 3) disposed at the transmission control device 20. As a result, the forward clutch 18 or the reverse clutch 19 is set in the engaged state and the advancing direction for the work vehicle is switched to the forward direction or the reverse direction.

As the forward/reverse switching lever 81 is switched to the neutral (N) position, the controller 10 outputs a control signal, in response to which the clutches 18 and 19 are set in the released state, to the transmission control device 20. Upon receiving the control signal for setting the clutches 18 and 19 in the released state, the transmission control device 20 reduces the clutch pressure, which is used to engage the clutches 18 and 19, via, the clutch control valve 26 (see FIG. 3) disposed at the transmission control device 20. As a result, the clutches 18 and 19 enter the released state, thereby setting the transmission 3 in the neutral state.

As the parking brake switch 83 is turned on, the controller 10 outputs a control signal for setting the clutches 18 and 19 in the released state to the transmission control device 20 in much the same way as that described above. As a result, the clutches 18 and 19 are released and the transmission 3 enters the neutral state regardless of the operating position of the forward/reverse switching lever 81.

In response to a switch-over at the forward/reverse switching lever 81 to the neutral (N) position or as the parking brake switch 83 is turned on, the controller 10 outputs the clutch release signal. Upon outputting the clutch release signal, the controller 10 decides that that transmission 3 is in the neutral state.

The pump pressure sensor 14 is connected to the controller 10. As described earlier, the pump pressure sensor 14 detects the output pressure Pp at the hydraulic rump 13 and outputs the pump pressure signal to the controller 10. If the output pressure Pp at the hydraulic pump 13, detected by the pump pressure sensor 14, is equal to or greater than a threshold value Pp1 (e.g., 5 MPa) stored in the ROM or the RAM at the controller 10, the controller 10 decides that the front device and/or the steering device is in an engaged state. If, on the other hand, the output pressure Pp at the hydraulic pump 13 detected by the pump pressure sensor 14 is less than the predetermined value Pp1, the controller 10 decides that neither the front device nor the steering device is in the engaged state (hereafter referred to as the front device-steering device in the unengaged state).

When the front device and the steering device are in the unengaged state, the accelerator pedal is in the non-operation state, either the transmission 3 is in the neutral state or the parking brake device 38 is in the engaged state and the service brake devices 5a are in the unengaged state, the controller 10 decides that an idling stop condition has been established. It is to be noted that instead of deciding whether or not either the transmission 3 is the neutral state or the parking brake device 38 is in the engaged state, a decision may be made as to whether or not the transmission 3 is in the neutral state and the parking brake device 38 is in the engaged state. In addition, since the transmission 3 enters the neutral state when the parking brake device 38 is in the engaged state, it is not necessary to decide whether or not the transmission 3 is in the neutral state as a criterion for the idling stop condition and it suffices to make a decision as to whether or not the parking brake device 38 is in the engaged state. In other words, making a decision as to whether or not the parking brake device 38 is in the engaged state is equivalent to making a decision as to whether or not the transmission 3 is in the neutral state.

The parking brake exclude mode switch 87, via which the state of engagement of the parking brake device 38 is excluded from the idling stop condition criteria, is connected to the controller 10. The controller 10 makes a decision as to whether or not the parking brake exclude mode switch 87 has been switched to the ON position, i.e., whether or not a mode in which the state of engagement of the parking brake device 38 is excluded from the idling stop condition criteria (hereafter referred to as a parking brake exclude mode) has been selected.

When the parking brake exclude mode is on, the controller 10 decides that the idling stop condition is in effect if the front device and the steering device are both in the unengaged state, the accelerator pedal is in the non-operation state, the transmission 3 is in the neutral state and the service brake devices 5a are in the unengaged state.

The controller 10 includes a built-in timer which is controlled by the controller 10. The timer starts a time count once the controller 10 decides that the idling stop condition has been established and keeps counting time as long as the idling stop condition persists. The controller 10 makes a decision as to whether or not the idling stop condition has been in effect over a predetermined duration length t1 stored in the ROM or the RAM, and upon deciding that the idling stop condition has been in effect over the predetermined duration length t1, it outputs an engine stop signal for turning off the engine 1 to the engine controller 9. It is to be noted that the duration length t1 may be freely set by the operator.

The controller 10 executes control under which the parking brake device 38 is automatically engaged in operation once the engine 1 stops. Through this control, the parking brake device 38 is automatically engaged in operation after the engine 1 is automatically turned off in the parking brake exclude mode and, as a result, availability of parking braking force is assured after the engine stops.

The following is a description of idling stop control given in reference to the flowchart presented in FIG. 8.

FIG. 8 presents a flowchart of the engine automatic stop control processing operation executed in the wheel loader achieved in an embodiment of the present invention. As the ignition switch 86 is turned on, a program enabling the processing shown in FIG. 8 is started up and the processing is repeatedly executed by the controller 10. It is to be noted that the flowchart does not include the flow of control under which the parking brake device 38 is automatically engaged after the engine stops, as described above.

It is to be noted that in this description, the operation of the ignition key to the start/on positions will be referred to as an ignition ON operation and the operation of the ignition key to the stop position will be referred to as an ignition OFF operation.

In step S106, information indicating the pedal operation quantity Sa at the accelerator pedal 52 and information indicating the pedal operation quantity Sb at the brake pedal 31, respectively detected by the pedal operation quantity detectors 52a and 31a, information indicating the output pressure Pp at the hydraulic pump 13 detected by the pump pressure sensor 14, and operating position information indicating the position of the parking brake switch 83, operating position information indicating the position of the parking brake exclude mode switch 87, and operating position information indicating the position of the forward/reverse switching lever 81, all detected by the controller 10, are obtained and then the operation proceeds to step S111.

In step S111, a decision is made as to whether or not the parking brake exclude mode switch 87 has been set to the ON operating position and thus the parking brake exclude mode has been set. If a negative decision is made in step S111, i.e., if it is decided that the parking brake exclude mode is not currently on, the operation proceeds to step S116.

In step S116, a decision is made as to whether or not the parking brake switch 83 has been set to the ON operating position, i.e., whether or not the parking brake device 38 is currently in the engaged state. Upon making an affirmative decision in step S116, the operation proceeds to step S121.

Upon making an affirmative decision in step S111, i.e., upon deciding that the parking brake exclude mode is currently on, the operation proceeds to step S113 to make a decision as to whether or not the operating position of the forward/reverse switching lever 81 is the neutral (N) position, i.e., whether or not the transmission 3 is currently in the neutral state. Upon making an affirmative decision in step S113, the operation skips step S116 and proceeds to step S121.

In step S121, a decision is made as to whether or not the pump output pressure Pp, having been obtained in step S106, is less than the preselected threshold value Pp1, i.e., whether or not the front device and the steering device are in the unengaged state. Upon making an affirmative decision in step S121, the operation proceeds to step S126.

In step S126, a decision is made as to whether or not the pedal operation quantity Sa at the accelerator pedal 52, having been obtained in step S106, is less than the preselected threshold value Sa1, i.e., whether or not the accelerator pedal 52 is in the accelerator non-operation state. Upon making an affirmative decision in step S126, the operation proceeds to step S131.

In step S131, a decision is made as to whether or not the pedal operation quantity Sb at the brake pedal 31, having been obtained in step S106, is less than the preselected threshold value Sb1, i.e., whether or not the service brake devices 5a are in the unengaged state. Upon making an affirmative decision in step S131, the operation proceeds to step S136 to make a decision as to whether or not a timer flag is off. As will be described later, the timer flag is turned off when the idling stop condition is no longer in effect or when the ignition enters the ignition off state.

If an affirmative decision is made in step S136, i.e., if it is decided that the timer flag is currently off, the operation proceeds to step S141. In this case, the controller 10 decides that the idling stop condition has been established, i.e., it decides that there is no current operation of the control levers 72 and 73, the steering wheel 62, the accelerator pedal 52 and the brake pedals 31, and thus the vehicle is in a stationary state with the transmission 3 in the neutral position. Accordingly, it starts a count at the timer and turns on the timer flag before the operation proceeds to step S146.

In step S146, a decision is made as to whether or not the length of time t having been counted at the timer is equal to or greater than the predetermined duration length t1 (e.g., 5 minutes). If a negative decision is made in step S146, the operation returns to step S106 to obtain the information indicating the pedal operation quantities Sa and Sb, the pump output pressure Pp, the operating position of the parking brake switch 83, the operating position of the parking brake exclude mode switch 87 and the operating position of the forward/reverse switching lever 81.

The processing in step S111 through step S131 is executed based upon the information obtained in step S106 so as to make a decision as to whether or not the various criteria for the idling stop condition are cleared. Upon deciding that the criteria are all cleared, the operation proceeds to step S136 to make a decision as to whether or not the timer flag is off.

If the timer flag was turned on the last time step S141 was executed as described earlier, a negative decision is made in step S136 and, in such a case, the operation skips step S141 and proceeds to step S146 to make a decision as to whether or not the length of time t counted on the timer is equal to or greater than the preselected duration length t1.

In other words, until it is decided that the idling stop condition, having been established, has been sustained over the preselected duration length t1, the processing in step S106 through step S146 is executed repeatedly in correspondence to each sampling cycle. If even one of the various criteria for the idling stop condition is not cleared, i.e., if a negative decision is made in any of steps S113 through S131, the operation proceeds to step S161 to reset the timer and turn off the timer flag before making a return. In other words, if the idling stop condition, having been sustained over a length of time less than the preselected duration length t1, is no longer in effect, the operation returns to the initial step to continuously detect the various types of information until the idling stop condition is established, and when the idling stop condition is reestablished, a timer count is started from t=0.

If it is decided in step S146 that the length of time t counted on the timer is equal to or greater than the preselected duration length t1, i.e., if it is decided that the idling stop condition has been held over a length of time equal to or greater than the time length t1, the operation proceeds to step S151 to output an engine stop signal to the engine controller 9. In response to the engine stop signal input thereto, the engine controller 9 controls the fuel injection device so as to stop the engine 1. Once the engine stop signal is output in step S151, the operation proceeds to step S156 to make a decision as to whether or not the operator has operated the ignition switch 86 to the stop position, i.e., whether or not the ignition switch is currently in the ignition off state. Upon making an affirmative decision in step S156, i.e., upon deciding that the ignition switch 86 is currently in the ignition off state, the operation proceeds to step S171 to reset the timer and turn off the timer flag. The operation then proceeds to step S176 to execute end processing by turning off various power sources and end the processing.

The following advantages are achieved through the embodiment described above.

(1) The controller 10 decides that the idling stop condition has been established when the front device and the steering device are both in the unengaged state, the accelerator pedal 52 is in the non-operation state, the transmission 3 is in the neutral state or the parking brake device 38 is in the engaged state, and the service brake devices 5a are in the unengaged state, and outputs an engine stop signal if the idling stop condition is held over a length of time equal to or greater than the preselected duration length t1. This means that an automatic stop of the engine 1 is enabled only if the work vehicle is in a stationary state while the control levers 72 and 73, the steering wheel 62, the accelerator pedal 52 and the brake pedals 31 remain unoperated, and either the transmission 3 is in the neutral state or the parking brake device 38 is engaged. It is to be noted that instead of deciding whether or not either the transmission 3 is in the neutral state or the parking brake device 38 is in the engaged state, a decision may be made as to whether or not the transmission 3 is in the neutral state and the parking brake device 38 is in the engaged state. In addition, since the transmission 3 enters the neutral state when the parking brake device 38 is in the engaged state, it suffices to make a decision as to whether or not the parking brake device 38 is in the engaged state as a criterion for the idling stop condition, as explained earlier. In other words, making a decision as to whether or not the parking brake device 38 is in the engaged state is equivalent to making a decision as to whether or not the transmission 3 is in the neutral state.

(2) The feature detailed in (1) makes it possible to ensure that the engine 1 does not stop unexpectedly while the work vehicle is traveling under inertia (e.g., while the work vehicle is coasting on flat ground at a minimum idling engine speed setting (a low idle setting) or traveling downhill at a minimum idling engine speed setting (a low idle setting)) with the control levers (the arm operation lever 72 and the bucket operation lever 73) remaining unoperated in the idling state.

(3) The feature detailed in (1) makes it possible to ensure that the engine 1 does not stop while the steering device is engaged in operation with the pressure oil output from the hydraulic pump 13, which is driven by the engine 1, and thus, a safe steering operation is assured while the work vehicle is traveling. In contrast, the work vehicle in the related art disclosed in patent literature 1, in which the engine 1 is stopped automatically against the wishes of the operator if the control levers remain unoperated continuously over a predetermined length of time, requires the operator to drive the work vehicle while paying close attention at all times in order to ensure that the steering operation is not disabled due to an unexpected stoppage of the engine 1.

(4) The feature detailed in (1) ensures that a sudden automatic stop does not occur at the engine 1 even if the operator's foot is on a brake pedal 8 in order to hold the wheel loader 100 in a stationary state and the control levers 72 and 73 and the steering wheel 62 remain unoperated, while, for instance, waiting for a traffic signal to change on a sloping road or waiting for traffic to start moving on a congested sloping road. In contrast, an automatic stop is bound to occur at the engine in the work vehicle in the related art disclosed in patent literature 1 if the control levers remain unoperated over a predetermined length of time while the work vehicle is held in a stationary state on a sloping road. Thus, the operator of the work vehicle in the related art needs to drive the work vehicle by paying constant attention in order to ensure that the work vehicle does not roll down the sloping road due to a failure to fully engage the service brake devices caused by an automatic stop at the engine, which stops the supply of pressure oil from the pilot hydraulic source to the brake valve. The present invention achieved in the embodiment is distinguishable in that an unintended automatic stop of the engine 1 never occurs while the service brake devices 5a are engaged, and thus, the braking force corresponding to the pedal operation quantity Sb at the brake pedal 31 is sustained via the service brake devices 5a so as to hold the work vehicle in the stationary state even on a sloping road.

(5) While the wheel loader 100 is parked on a sloping road, the accelerator pedal 52 and the brake pedals 31 remain unoperated, the control levers 72 and 73 and the steering wheel 62 remain unoperated and the parking brake device 38 is set in the engaged state. Even if the engine automatically stops under these conditions, the feature detailed in (1) makes it possible to hold the wheel loader 100 in the parked state since the parking braking force is sustained via the parking brake device 38.

(6) The time count t on the timer is reset if the ignition switch 86 is operated to the stop operating position after the idling stop condition remains in effect for a length of time equal to or greater than the preselected duration length t1 and the controller 10 consequently automatically stops the engine 1. Thus, following the automatic stop at the engine 1, the operator is able to restart the engine 1 with ease by first operating the ignition switch 86 to the stop position from the on position and then simply setting the ignition switch 86 back to the start position.

(7) While a work vehicle such as the wheel loader 100 achieved in the embodiment is engaged in operation on flat ground, the operator may take a break inside the vehicle or leave the vehicle without engaging the parking brake device 38. The wheel loader 100 achieved in the embodiment includes the parking brake exclude mode switch 87, which allows the state of engagement of the parking brake device 38 to be excluded from the criteria for the idling stop condition, so as to increase likelihood (frequency) of the engine 1 coming to an automatic stop. As a result, better energy efficiency is assured. It is to be noted that since the parking brake device 38 is automatically engaged as the engine 1 comes to an automatic stop, a parking braking force is sustained even after the engine stops.

(8) As described above, an unintended automatic stop of the engine 1 is prevented and safe, energy efficient operation is enabled in the wheel loader 100 achieved in the embodiment. Since the operator driving the wheel loader 100 does not need to pay particular attention in order to prevent an unintended stop of the engine 1, the onus placed on the operator is reduced.

(9) Even if the operator parks the work vehicle in order to take a break without turning off the engine 1, the engine 1 comes to an automatic stop after a predetermined length of time elapses, and thus, needless exhaust gas emission is minimized. In addition, the work vehicle achieved in the embodiment will be ideal in use in areas where the engine 1 of a parked vehicle is required to be turned off by law.

The following variations are also within the scope of the present invention, and one of the variations or a plurality of variations may be adopted in combination with the embodiment described above.

(Variations)

(1) While the controller 10 makes a decision as to whether or not the service brake devices 5a are in the unengaged state based upon the pedal operation quantity Sb (the pedal stroke or the pedal angle) at the brake pedal 31 input to the controller 10 from the pedal operation quantity detector 31a in the embodiment described above, the present invention is not limited to this example. For instance, a detector (not shown) that detects the stepping force applied to a brake pedal 31 may be disposed and, in such a case, the controller 10 may decide that the service brake devices 5a are in the unengaged state if the stepping force is less than a predetermined value. As an alternative, the controller 10 may compare the braking pressure Pb detected via the pressure sensor 33 with a threshold value Pb2 stored in the ROM or the RAM at the controller 10 and decide that the service brake devices Sa are in the unengaged state if the braking pressure Pb is less than the threshold value Pb2. The threshold value Pb2 used when deciding whether or not the service brake devices 5a are in the unengaged state based upon the braking pressure Pb should be set to approximately 0.15 MPa.

(2) While the controller 10 in the embodiment described above makes a decision as to whether or not the accelerator pedal 52 has been operated based upon the pedal operation quantity Sa (the pedal stroke or the pedal angle) at the accelerator pedal 52 input to the controller 10 from the pedal operation quantity detector 52a, the present invention is not limited to this example. For instance, the controller 10 may instead compare the target engine rotation speed Ns with a threshold value Ns1 stored in the ROM or the RAM at the controller 10 and decide that the accelerator pedal 52 is currently in the non-operation state if the target rotation speed Ns is less than the threshold value Ns1. The threshold value Ns1 may be set to, for instance, the rotation speed of 850 rpm, which is higher than the minimum idling engine speed rotation speed Lo=800 rpm by a predetermined value of 50 rpm. As a further alternative, the controller 10 may make a decision as to whether or not the accelerator pedal 52 has been operated based upon the degree of throttle opening for the accelerator or based upon the actual rotation speed Na at the engine 1 detected by the engine rotation rate sensor 50.

(3) While the controller 10 in the embodiment described above makes a decision as to whether or not the front device and the steering device are in the unengaged state based upon the pump output pressure Pp at the hydraulic pump 13 input to the controller 10 from the pump pressure sensor 14, the present invention is not limited to this example. Decisions may instead be made individually as to whether or not the front device is in the unengaged state and whether or not the steering device is in the unengaged state.

For instance, the controller 10 may make a decision as to whether or not the front device is in the unengaged state based upon pilot pressure information individually provided from pilot pressure detection sensors that detect the operating pilot pressure at the arm operation lever 72 and the operating pilot pressure at the bucket operation lever 73. If the pilot pressures p detected via the individual pilot pressure sensors (not shown) are both less than a predetermined value pa indicated in FIG. 5, the controller 10 will decide that neither the arm operation lever 72 nor the bucket operation lever 73 is currently being operated and thus neither the arm 111 nor the bucket 112 is currently engaged in operation, i.e., the front device is currently in the unengaged state.

A decision as to whether or not the steering device is in the unengaged state may be made by detecting the operation quantity at the steering wheel 72 via, for instance, an angle sensor capable of detecting the rotational angle or the like disposed at the steering column. In this ease, if the operation quantity at the steering wheel 62 is less than a predetermined value, the controller 10 will decide that the steering wheel 62 is not being operated and thus the steering device is not currently engaged, i.e., the steering device is currently in the unengaged state.

(4) While the structure achieved in the embodiment described above includes the parking brake exclude mode switch 87, which allows the state of engagement of the parking brake device 38 to be excluded from the criteria for the idling stop condition, the present invention is not limited to this example. In other words, the parking brake exclude mode switch 87 may be omitted and the state of engagement of the parking brake device 38 may be always included as a criterion for the idling stop condition. Through this alternative, too, advantages similar to those described in (1) through (5), (8) and (9) in reference to the embodiment will be achieved.

(5) While the time count at the timer is reset when the ignition switch 86 is operated to the stop position in the embodiment described above, the present invention is not limited to this example. The time count on the timer may instead be reset when an engine start signal is output in response to an operation performed at the ignition switch 86 to set it to the start position, or the time count on the timer may be reset when an engine stop signal is output after the idling stop condition is held continuously over a predetermined length of time.

(6) While the present invention is adopted in a vehicle equipped with a torque converter in the embodiment described above, the present invention is not limited to this example. The present invention may instead be adopted in the type of wheel loader commonly referred to as an HST-drive wheel loader. In the HST-drive wheel loader, the state in which the forward reverse switching lever 81 is held at the neutral position is equivalent to the neutral state at the transmission 3.

(7) While the work vehicle according to the present invention is represented by the wheel loader 100 in the embodiment described above, the present invention is not limited to this example, and may be adopted in other types of work vehicles including, for instance, a wheel excavator, a forklift, a telescopic handler and a lift truck.

The present invention is in no way limited to the particulars of the embodiment described above, and allows any modifications and alterations to be made as long as they do not deviate from the scope and teachings of the invention.

The disclosure of the following priority application is herein incorporated by reference:
Japanese Patent Application No. 2011-250020 filed Nov. 15, 2011

The invention claimed is:

1. An engine control device for a work vehicle, comprising:
   a controller having a CPU that
      makes a decision as to whether or not a front device is in an unengaged state,
      makes a decision as to whether or not a steering device is in an unengaged state,
      makes a decision as to whether or not an accelerator pedal is in a non-operational state,
      makes a decision as to whether or not a transmission is in a neutral state,
      makes a decision as to whether or not a parking brake device is in an engaged state,
      makes a decision as to whether or not a service brake device is in an unengaged state,
      decides that an idling stop condition has been established when the front device is in the unengaged state, the steering device is in the unengaged state, the accelerator pedal is in the non-operational state, the transmission is in the neutral state, or the parking brake device is in the engaged state, and the service brake device is in the unengaged state,
      starts a time count when it has been decided that the idling stop condition is established and continues the time count,
      makes a decision as to whether or not the time count exceeds a predetermined length of time,
      executes an engine automatic stop control which stops an engine when it is decided that the time count exceeds the predetermined length of time; and
   a parking brake exclude mode switch that is connected with the controller, and excludes only a state of engagement of the parking brake device decided by the controller from criteria for the idling stop condition while still including the criteria for the front device, the steering device, the accelerator pedal, the transmission, and the service brake device.

2. The engine control device for a work vehicle according to claim 1, further comprising:
   an ignition switch that assumes at least three operating positions that are an engine start position, an engine on position and an engine stop position, wherein:
   the time count is reset if the ignition switch is operated to the stop position after the engine is stopped through the engine automatic stop control.

3. The engine control device for a work vehicle according to claim 1, wherein:
   while the state of engagement of the parking brake device is excluded from the criteria for the idling stop condition via the parking brake exclude mode switch, the controller decides that the idling stop condition is established when the front device is in the unengaged state, the steering device is in the unengaged state, the accelerator pedal is in the non-operational state, the transmission is in the neutral state and the service brake device is in the unengaged state.

4. The engine control device for a work vehicle according to claim 1, wherein:
   the controller executes control under which the parking brake device is engaged in operation once the engine stops through the engine automatic stop control.

5. An engine control device for a work vehicle, comprising:
   a front device non-engagement decision-making unit that makes a decision as to whether or not a front device is in an unengaged state;
   a steering device non-engagement decision-making unit that makes a decision as to whether or not a steering device is in an unengaged state;
   a pedal non-operation state decision-making unit that makes a decision as to whether or not an accelerator pedal is in a non-operation state;
   a neutral state decision-making unit that makes a decision as to whether or not a transmission is in a neutral state;

a parking brake engagement decision-making unit that makes a decision as to whether or not a parking brake device is in an engaged state;

a service brake non-engagement decision-making unit that makes a decision as to whether or not a service brake device is in an unengaged state;

a condition decision-making unit that decides that an idling stop condition has been established when the front device is in the unengaged state, the steering device is in the unengaged state, the accelerator pedal is in the non-operation state, either the transmission is in the neutral state or the parking brake device is in the engaged state or the transmission is in the neutral state and also the parking brake device is in the engaged state, and the service brake device is in the unengaged state;

a time count unit that starts a time count when the condition decision-making unit has decided that the idling stop condition is established and continues the time count while the idling stop condition is in effect;

a time passage decision-making unit that makes a decision as to whether or not the time count at the time count unit exceeds a predetermined length of time;

an engine automatic stop control unit that stops an engine when the time passage decision-making unit decides that the time count at the time count unit exceeds the predetermined length of time;

a selector member that excludes a state of engagement of the parking brake device from criteria for the idling stop condition, wherein while the state of engagement of the parking brake device is excluded from the criteria for the idling stop condition via the selector member, the condition decision-making unit decides that the idling stop condition is established when the front device is in the unengaged state, the steering device is in the unengaged state, the accelerator pedal is in the non-operation state, the transmission is in the neutral state and the service brake device is in the unengaged state.

* * * * *